Patented Sept. 13, 1938

2,130,008

UNITED STATES PATENT OFFICE 2,130,008

PRODUCTION OF CHEMICALLY RESISTANT RUBBER COATINGS

Henry H. Harkins, River Edge, N. J., assignor to United States Rubber Products, Inc., New York, N. Y., a corporation of Delaware No Drawing. Application October 17, 1935, Serial No. 45,435

8 Claims. (Cl. 91—68)

This invention relates to improvements in the production of chemically resistant linings or coatings and more particularly to a type of rubber composition suitably adapted for lining tanks, conduits, etc., used in conveying corrosive liquids, more especially those of oxidizing character such as chlorine water.

The disadvantage of many known rubber linings is that they do not stand up in service, especially where used in contact with such strongly oxidizing liquids as water containing chlorine or active chlorine compounds. Where the composition is of soft rubber, it is quickly attacked, becomes brittle on the surface and cracks easily. Hard rubber compositions, in general, also deteriorate in contact with chlorine water, the rubber surface being attacked with formation of a powder, which is referred to as chalking. This type of corrosion is especially pronounced when the coating is repeatedly alternately wet by the aqueous chlorine solution and then dried. Although the variables in rubber compounding practice are many, no knowledge has been heretofore available whereby to design a composition adapted to effectively avoid the said disadvantages.

An object of this invention is to provide a rubber composition adapted for lining receptacles including conduits, and vulcanizable in situ to a semi-hard flexible condition such as to resist the chalking action of chlorine water and without becoming brittle in service. Other objects will be apparent from the following description.

Broadly the invention comprises a wall structure, and a lining therefor of a vulcanized semi-hard rubber composition containing a large amount of carbon black substantially in excess of 100 parts by weight per 100 parts by weight of rubber and a large amount of a flexibility-imparting agent which is inert to chlorine. Less broadly, the invention comprises preparing and applying to a wall surface, usually metallic, a vulcanizable rubber composition containing a large amount of carbon black substantially in excess of 100 parts by weight per 100 parts by weight of rubber, sufficient sulphur to produce a vulcanized coating containing between 15 and 30 parts by weight of sulphur per 100 parts by weight of rubber, and a large amount of a flexibility-imparting agent adapted to render the composition easily calenderable before cure and of the desired flexibility after cure, and curing the said rubber composition in situ until substantially all of the sulphur is chemically combined with the rubber. Such a semi-hard rubber lining is chemically and electrically distinguished from hard rubber, and also from soft rubber linings and provides a desirable composite rubber-to-metal assembly for many different kinds of receptacles used in the storing or conveying of chemicals similar to chlorine water in their corrosive action on rubber.

The surface treated is usually metallic, such as used for tanks, tank cars, pipe lines, etc., but may be otherwise. The rubber composition is preferably integrally bonded to the metal surface by a suitable rubber-to-metal adhesive.

The following example illustrates the invention but is not to be construed as limiting thereof; the parts are by weight:

A composition consisting of smoked sheet 100 parts, thermatomic carbon 150 parts, asphalt (high softening point) 50 parts, diphenyl guanidine (accelerator, 2.0 parts, lime (hydrated) 10 parts, sulfur 20 parts, dinaphthylamine (antioxidant) 1.0 part, may be calendered and applied to a metallic surface after treating the surface with a rubber-to-metal adhesive, and vulcanized for 2 hours in steam at a pressure of 45 lbs./sq. in., or in the case of a tank it may be filled with hot water heated sufficiently to vulcanize the coating.

After six months' immersion in saturated chlorine water, a similar vulcanized composition as indicated is practically unattacked, whereas the average rubber coating composition suitable for lining tanks, pipes, etc. under the same conditions is badly attacked or completely destroyed. The vulcanized composition has excellent flexibility over atmospheric temperature ranges and is therefore physically suitable for pipe or tank lining. It moreover has high chemical resistance to other halogen or halogen acid solutions, and is serviceable as a protective coating for apparatus used in paper mills, water purification plants, etc.

The carbon black may be of any type, hard or soft, and should be used in amounts substantially in excess of 100 parts by weight per 100 parts by weight of rubber to obtain a non-chalking stock. The proportion by weight of sulfur to rubber should be between 15 and 30 percent, and the vulcanization should be carried out so that at least 15 to 20, and preferably not more than 25 percent of sulfur becomes chemically combined with the rubber during the cure.

Instead of high-softening point asphalt, other flexibility-imparting agents inert to chlorine may be used, for example, pitches, mineral rubber and bituminous materials in general; semi-solid or solid chlorinated hydrocarbons, such as chlorinated naphthalenes and chlorinated diphenyls,— and in general, any thermoplastic or resinous material which is nonhardenable by heat and is substantially inert to chlorine water.

The rubber may, if desired, also be admixed with any well-known synthetic rubber-like materials having high resistance to solvents such as gasoline, oil and the like.

Various other accelerators, antioxidants, and fillers may be used, and other modifications may be made without departing from the spirit and scope of the invention.

Other uses for the invention are in connection with chemical process tanks, and receptacles used in the manufacture of chlorinated copperas which is used for coagulating sewage.

Having thus described my invention, what I claim and desire to protect by Letters Patent is:

1. A method of forming a chemically resistant rubber coating on a supporting wall which comprises applying to said wall a vulcanizable rubber composition containing a large amount of carbon black and a flexibility-imparting agent substantially inert to chlorine, and between about 15 and 30 percent by weight of sulphur based on the rubber content and vulcanizing the coating in situ for a time and at a temperature sufficient to bring about chemical combination with the rubber portion of substantially all of the sulphur, whereby to form a flexible semi-hard rubber coating which is resistant to the chalking action of chlorine water.

2. A construction comprising a supporting wall and a lining therefor of a vulcanized semi-hard rubber composition having a vulcanization coefficient of from 15 to 25 and containing an amount of carbon black substantially in excess of 100 parts by weight per 100 parts by weight of rubber and a large amount of a flexibility-imparting agent which is inert to chlorine.

3. A composite rubber-to-non-rubber assembly wherein a surface of the non-rubber portion is integrally bonded to a vulcanized flexible semi-hard rubber coating containing large amounts of carbon black and of a flexibility-imparting agent inert to chlorine and between 15 and 30 percent by weight based on the rubber content of chemically-combined sulphur.

4. A composite rubber-to-metal assembly wherein a surface of the metal portion is integrally bonded to a vulcanized flexible semi-hard rubber coating containing an amount of carbon black substantially in excess of 100 parts by weight per 100 parts by weight of rubber and a relatively large amount of a flexibility-imparting agent substantially inert to chlorine and from 15 to 25 percent by weight based on the rubber content of chemically-combined sulphur.

5. A receptacle having a surface integrally bonded to a vulcanized flexible semi-hard rubber coating containing an amount of carbon black substantially in excess of 100 parts by weight per 100 parts by weight of rubber and a relatively large amount of a high-softening asphaltic material, and from 15 to 25 percent by weight based on the rubber content of chemically-combined sulphur, said coating being characterized in being resistant to the chalking action of chlorine water.

6. A composite rubber-to-non-rubber assembly wherein a surface of the non-rubber portion is integrally bonded to a vulcanized flexible semi-hard rubber coating containing by weight based on 100 parts by weight of rubber, about 150 parts of carbon black, about 50 parts of a high-softening point asphaltic material, and from 15 to about 20 parts of chemically-combined sulphur.

7. A composite rubber-to-non-rubber assembly wherein a surface of the non-rubber portion is integrally bonded to a vulcanized flexible semi-hard rubber coating containing, by weight per 100 parts by weight of rubber, about 150 parts of carbon black, about 50 parts of a high softening point resinous material highly resistant to aqueous solution of halogen, and from 15 to about 20 parts of chemically-combined sulphur.

8. A construction comprising a wall structure having a lining bonded thereto, which lining is composed of vulcanized flexible semi-hard rubber having a vulcanization coefficient of from 15 to 25 and containing a high proportion by weight based on the rubber of carbon black and a flexibility-imparting agent which is substantially inert to chlorine.

HENRY H. HARKINS.